(12) United States Patent
Kim et al.

(10) Patent No.: US 11,292,434 B2
(45) Date of Patent: Apr. 5, 2022

(54) WIPER DEVICE

(71) Applicant: CAP CORPORATION, Gyeongsangbuk-do (KR)

(72) Inventors: Myoung-Yeon Kim, Ulsan (KR); Jae-Yong Jeong, Daegu (KR)

(73) Assignee: CAP CORPORATION, Gyeongsangbuk-Do (KR)

( * ) Notice: Subject to any disclaimer, the term of this patent is extended or adjusted under 35 U.S.C. 154(b) by 0 days.

(21) Appl. No.: 16/794,932

(22) Filed: Feb. 19, 2020

(65) Prior Publication Data
US 2020/0269816 A1     Aug. 27, 2020

(30) Foreign Application Priority Data
Feb. 21, 2019   (KP) .......................... 10-2019-0020563

(51) Int. Cl.
*B60S 1/38*     (2006.01)

(52) U.S. Cl.
CPC ............ *B60S 1/3801* (2013.01); *B60S 1/3806* (2013.01); *B60S 2001/3813* (2013.01); *B60S 2001/3815* (2013.01)

(58) Field of Classification Search
CPC .................. B60S 1/3806; B60S 1/3801; B60S 2001/3812; B60S 2001/3813; B60S 2001/3815; B60S 2001/3843
USPC ........................ 15/250.44, 250.46, 250.201
See application file for complete search history.

(56) References Cited

U.S. PATENT DOCUMENTS

| | | | | |
|---|---|---|---|---|
| 3,816,870 A | * | 6/1974 | Riester .................. | B60S 1/3801 15/250.46 |
| 3,872,535 A | * | 3/1975 | Arman .................. | B60S 1/3801 15/250.46 |
| 3,874,025 A | * | 4/1975 | Cone ..................... | B60S 1/3801 15/250.46 |
| 3,942,212 A | * | 3/1976 | Steger .................. | B60S 1/4083 15/250.201 |
| 4,180,885 A | * | 1/1980 | Thornton .............. | B60S 1/3801 15/250.32 |

(Continued)

FOREIGN PATENT DOCUMENTS

| | | | |
|---|---|---|---|
| GB | 1378533 | * | 12/1974 |
| GB | 1403469 | * | 8/1975 |

(Continued)

OTHER PUBLICATIONS

Korean Office Action dated Feb. 9, 2020 in corresponding South Korean Patent Application No. 10-2019-0020563.

*Primary Examiner* — Gary K. Graham
(74) *Attorney, Agent, or Firm* — Grossman, Tucker, Perrault & Pfleger, PLLC

(57) ABSTRACT

A wiper device is disclosed. The wiper device coupled to a wiper arm to remove a foreign substance of the present invention includes a contact member configured to wipe off the foreign substance; a lever structure configured to press the contact member to be in contact with a windshield and having a plurality of levers connected in a multi-level structure from the wiper arm to the contact member; and an adapter configured to be coupled to the lever structure and connected to the wiper arm, wherein at least one lever of the plurality of levers is formed to have less width or equal width to that of a lower lever, based on the multi-level structure.

3 Claims, 10 Drawing Sheets

(56) References Cited

U.S. PATENT DOCUMENTS

| | | | | |
|---|---|---|---|---|
| 4,422,207 A | * | 12/1983 | Maiocco | B60S 1/3801 |
| | | | | 15/250.32 |
| 4,953,251 A | * | 9/1990 | Chow | B60S 1/3801 |
| | | | | 15/250.46 |
| 5,735,799 A | * | 4/1998 | Baba | A61B 5/021 |
| | | | | 600/485 |
| 7,921,504 B1 | * | 4/2011 | Chiang | B60S 1/3801 |
| | | | | 15/250.46 |
| 8,745,812 B2 | | 6/2014 | Kruse et al. | |
| 8,966,706 B2 | * | 3/2015 | Song | B60S 1/3801 |
| | | | | 15/250.46 |
| 2002/0133896 A1 | * | 9/2002 | Herinckx | B60S 1/3801 |
| | | | | 15/250.46 |
| 2005/0166349 A1 | * | 8/2005 | Nakano | B60S 1/3806 |
| | | | | 15/250.201 |
| 2013/0219649 A1 | * | 8/2013 | Tolentino | B60S 1/3806 |
| | | | | 15/250.32 |

FOREIGN PATENT DOCUMENTS

| | | |
|---|---|---|
| KR | 20-0445909 | 9/2009 |
| KR | 10-2010-0064983 | 6/2010 |

* cited by examiner

WIPER DEVICE

CROSS REFERENCE TO RELATED APPLICATION(S)

This application claims the benefit under 35 USC § 119(a) of Korean Patent Application No. 10-2019-0020563 filed on Feb. 21, 2019 in the Korean Intellectual Property Office, the entire disclosure of which is incorporated herein by reference for all purposes.

BACKGROUND

1. Field

The present invention relates to a wiper device.

2. Description of Related Art

When a windshield of a vehicle in driving is contaminated by various substances, including dust in the atmosphere or rain or snow, it becomes difficult to secure a clear view and can affect the safety of driving. Thus, a wiper for clearing snow, rain, or debris is equipped on the windshield in order to secure the clear view for the safety of a driver. The wiper device is connected to a wiper arm installed in the vehicle and is operated by the wiper arm.

A tournament structure with multi-level lever among various wiper devices has a structure in which an extension lever (a secondary lever) and a york are sequentially connected to a primary lever which is coupled with a wiper arm to receive the force necessary for operating a wiper.

However, in the conventional tournament type wiper device, since an upper lever is placed on top of a lower lever to be connected each other, there is a problem that the height increases proportionally as the lever has a multi-level structure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An object of the present invention is to provide a wiper device having a multi-level lever structure and capable of keeping the height of the entire lever structure low.

There is provided a wiper device coupled to a wiper arm to remove a foreign substance, including a contact member configured to wipe off the foreign substance; a lever structure configured to press the contact member to be in tight contact with a windshield and having a plurality of levers connected in a multi-level structure from the wiper arm to the contact member; and an adapter configured to be coupled to the lever structure and connected to the wiper arm, wherein at least one lever of the plurality of levers is formed to have less width or equal width to that of a lower lever based on the multi-level structure.

According to the present invention, it is possible to provide a lever structure connected in a multi-level structure wherein an upper lever is inserted into a part of a lower lever, so that even if the hinge structure is extended, the height increase of the lever structure can be limited to the minimum.

In addition, the range in which the yoke can rotate in the lever structure is secured enough to more tightly contact the contact member to the windshield, thereby improving the wiping performance.

BRIEF DESCRIPTION OF THE DRAWNIGS

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Hereinafter, the embodiment of the present invention will be described in detail with reference to the accompanying drawings.

Figure 1:
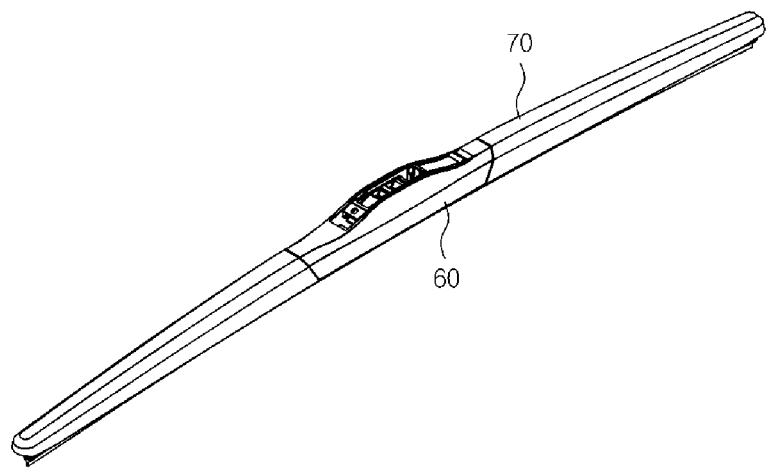
FIG. 1 is a perspective view illustrating a wiper device according to an embodiment of the present invention.
Figure 2:
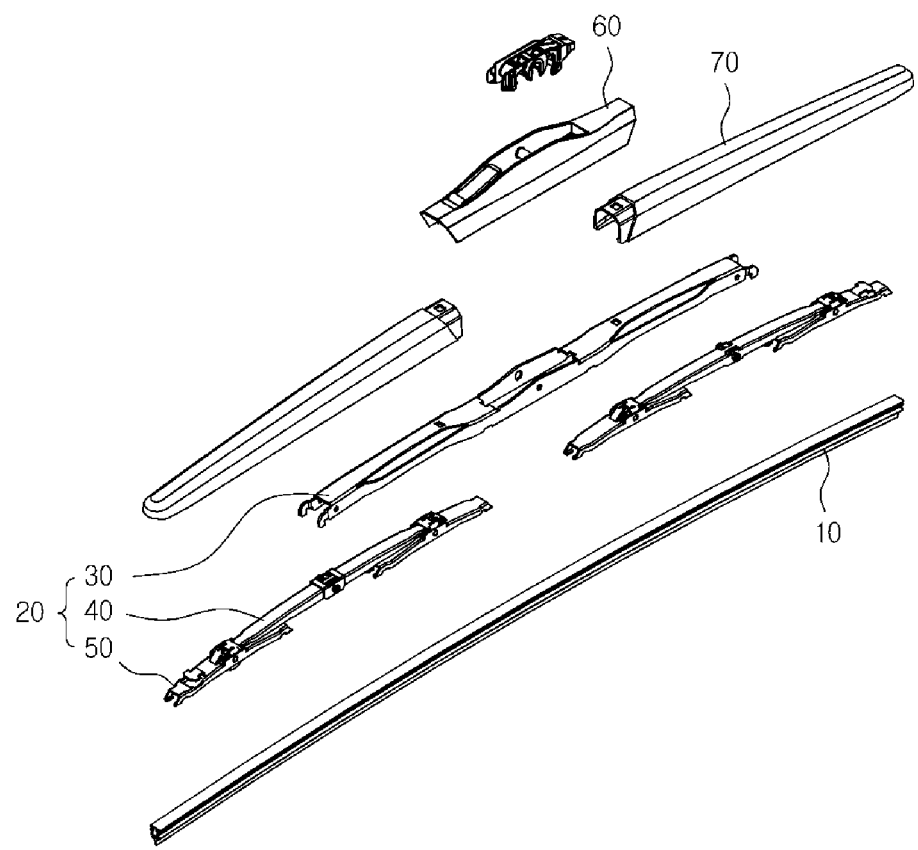
FIG. 2 is an exploded view illustrating a wiper device according to an embodiment of the present invention.

FIG. 1 is a perspective view illustrating a wiper device according to an embodiment of the present invention and FIG. 2 is an exploded view illustrating a wiper device according to an embodiment of the present invention.

The wiper device according to an embodiment of the present invention is a wiper device for removing foreign substances attached to a windshield and includes a contact member 10, a lever structure 20, and an adapter 60.

The contact member 10 may be tightly contacted to a windshield to wipe off foreign substances and include various known contact members 10 such as a rubber wiper blade. The contact member 10 may further include a support member for elastically supporting the contact member 10.

The lever structure 20 presses and supports the contact member 10 toward the windshield so that the contact member 10 comes into tight contact with the windshield. The lever structure 20 may have a structure in which a plurality of levers are connected in a multi-level structure from the wiper arm to the contact member 10. That is, the lever closest to the wiper arm may become the uppermost lever and a plurality of lower levers may be connected to each other in order to expand the structure of the lever toward the contact member 10.

The lever structure 20 may be connected to the wiper arm through the adapter 70 to receive the pressing pressure from the wiper arm. The pressing pressure received from the wire arm may be transmitted to each of the connected levers and the pressing pressure transmitted to the levers may be transmitted to the contact member 10 to bring the contact member 10 into close contact with the curved surface of the vehicle windshield.

Particularly, in the lever structure 20 of the present embodiment, at least one lever among the plurality of levers constituting the lever structure 20 may have a width smaller than or equal to that of the lower lever based on the multi-level structure. Thus, a structure in which the upper lever is inserted as a part of the lower lever, rather than a structure in which the upper lever is mounted on the lower lever, may be formed. Therefore, unlike the conventional structure in which the height of the multi-level structure of the lever structure 20 increases in proportion to the number of levels, the height of the lever structure 20 may be increased only slightly even if the number of levels is increased.

Figure 3:
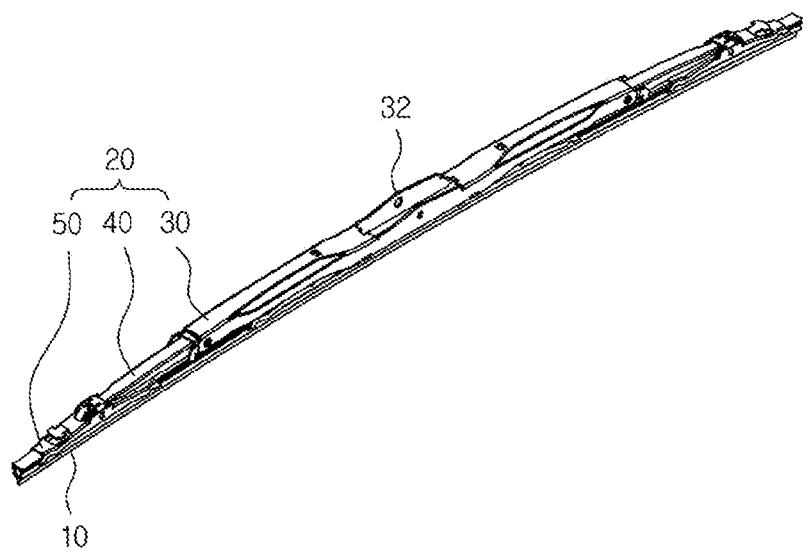
FIG. 3 is a diagram illustrating a lever structure coupled to a contact member in a wiper device according to an embodiment of the present invention.
Figure 4:
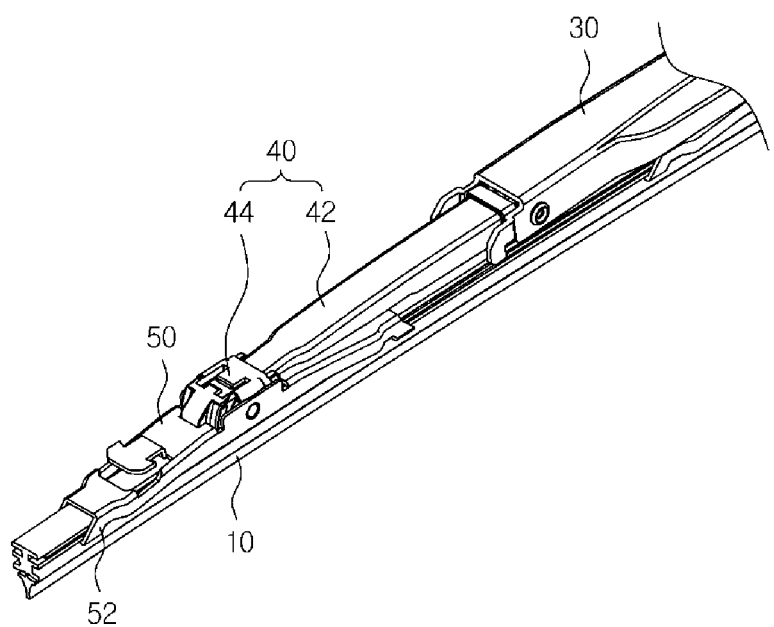
FIG. 4 is an enlarged view illustrating one side of a lever structure in a wiper device according to an embodiment of the present invention.

FIG. 3 is a diagram illustrating a lever structure coupled to a contact member 10 in a wiper device according to an embodiment of the present invention and FIG. 4 is an enlarged view illustrating one side of a lever structure in a wiper device according to an embodiment of the present invention.

For example, the lever structure 20 of the present embodiment may include a primary lever 30 and an extension lever 40 hinge-connected to the primary lever 30.

Referring to FIG. 3 and FIG. 4, the lever structure 20 of the present embodiment may include a primary lever 30 disposed in the center and a pair of extension levers 40 hinge-connected to both ends of the primary lever 30. In addition, a yoke 50 may be connected to the extension lever 40 in a hinge structure. A grip 52 that holds the contact member 10 may be provided at an end portion of the yoke 50.

Here, a width of the extension lever 40 may be formed to be less than or equal to that of the yoke 50.

Figure 5:
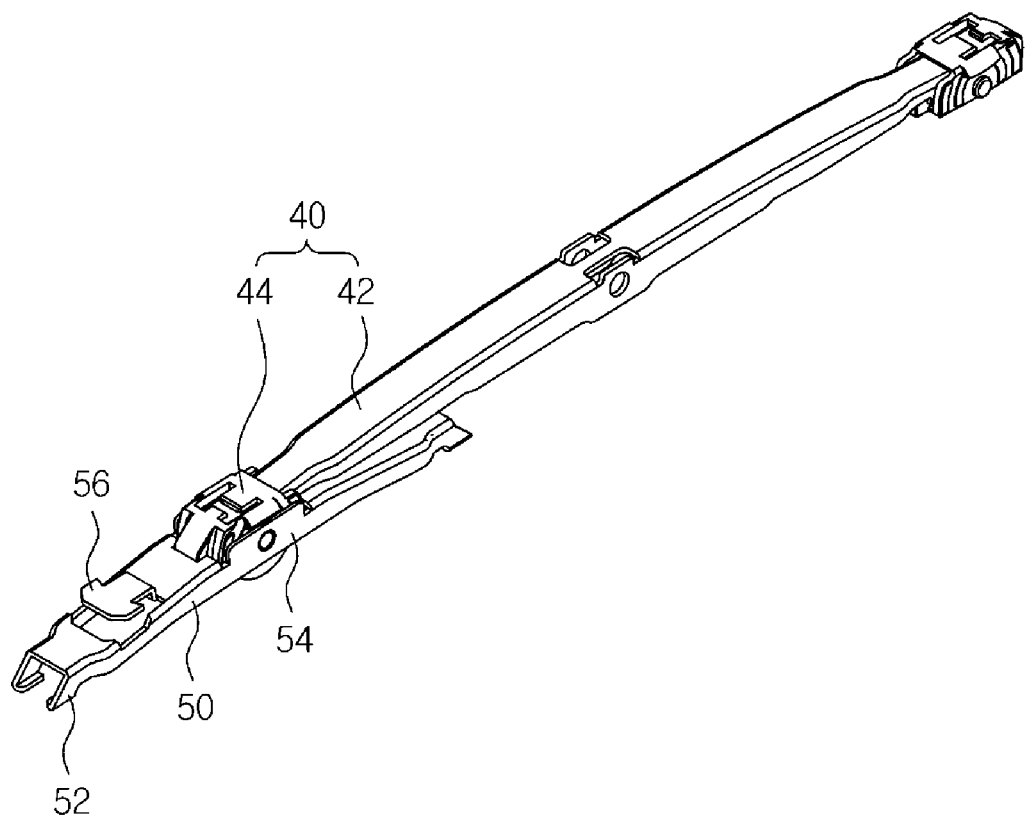
FIG. 5 to FIG. 7 are enlarged views illustrating a connection of an extension lever and a yoke in a lever structure of a wiper device according to an embodiment of the present invention.
Figure 6:
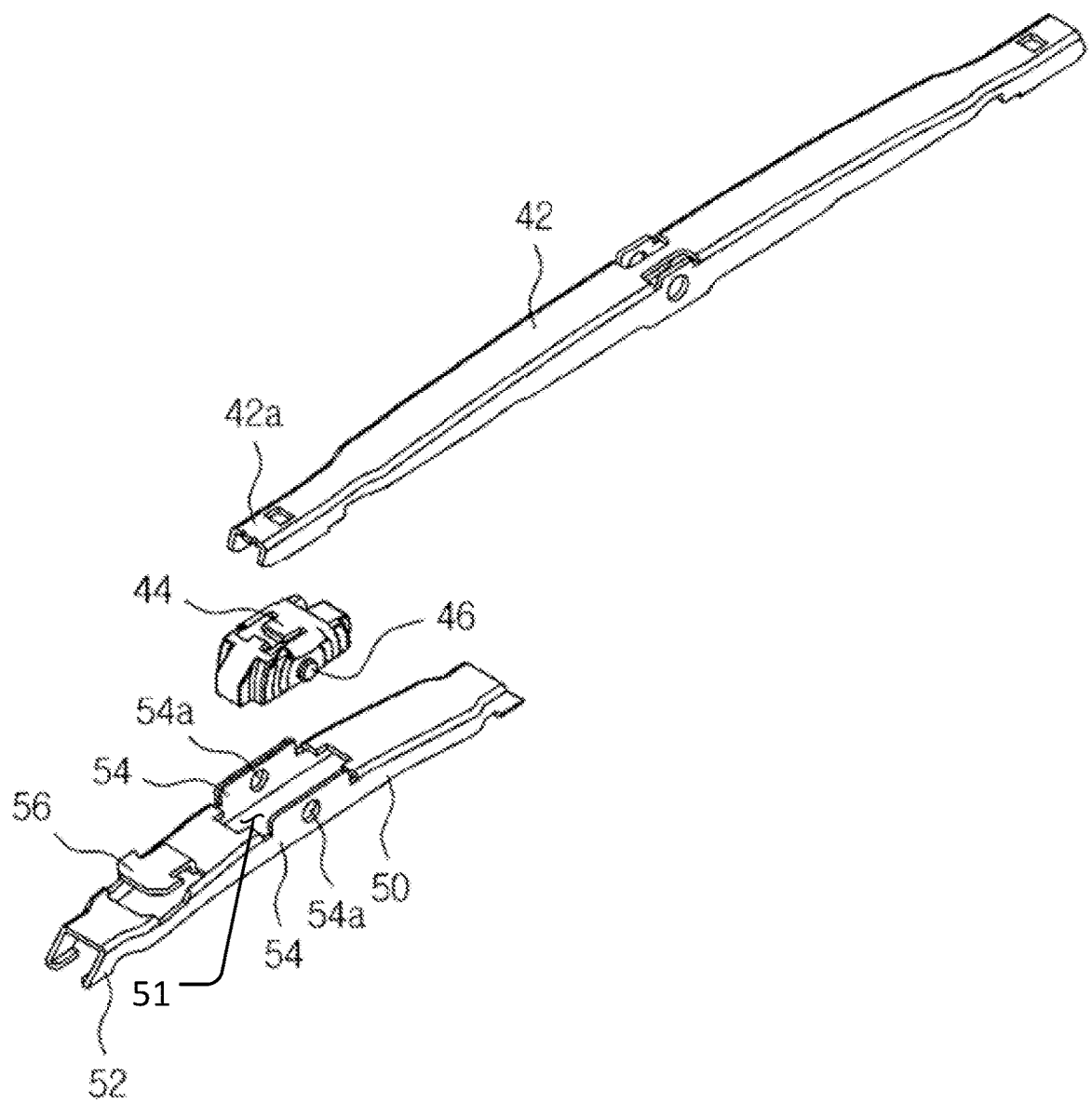
Figure 7:
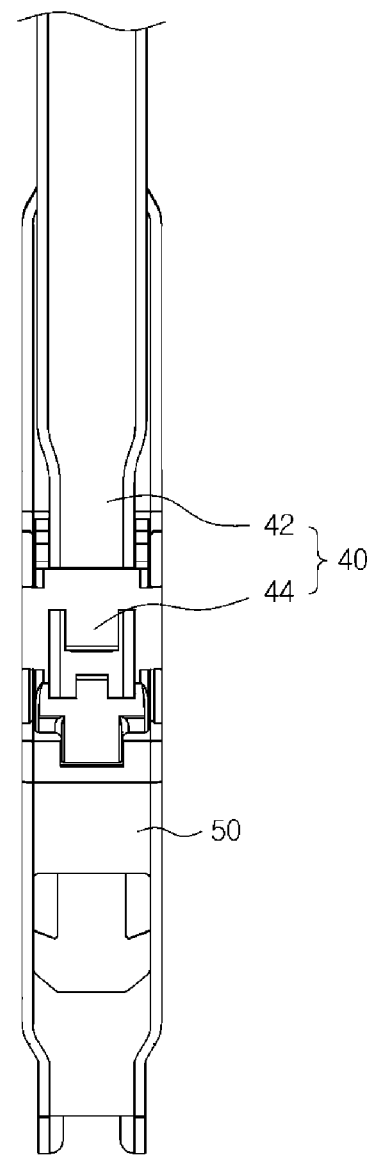

FIG. 5 to FIG. 7 are enlarged views illustrating a connection of an extension lever and a yoke in a lever structure of a wiper device according to an embodiment of the present invention.

Referring to FIG. 5 to FIG. 7, a yoke 50 may include a pair of hinge walls 54 facing each other. Here, the yoke 50 may have a penetration part 51 formed at a middle portion thereof. The penetration part 51 of the yoke 50 may be vertically perforated and have either lateral surface thereof blocked. The two lateral surfaces of the penetration part 51 may form a pair of hinge walls 54 that face opposite to each other.

One end of the extension lever 40 may be inserted between the pair of hinge walls 54 to be hinge-connected. That is, since one end of the extension lever 40 is inserted into and coupled to a part of the yoke 50, the height increase of the hinge connection may be limited to the minimum. Since the extension lever 40 covers a part of the yoke 50 and the yoke 50 and the extension lever 40 overlap with each other by a hinge in the conventional wiper device, the height of the lever structure 20 is increased proportionally every time the hinge connection between the york 50 and the extension lever 40 stacked on the york 50 is made.

In addition, unlike the conventional wiper device, since the yoke 50 of the present invention does not placed under the extension lever 40, the rotation of the yoke 50 may not be disturbed by the extension lever 40. Thus, the range in which the yoke 50 can be rotated is sufficiently secured when the wiper is operated, so that the contact member 10 can be brought into tight contact with the windshield more effectively, thereby improving the wiping performance.

Figure 10:
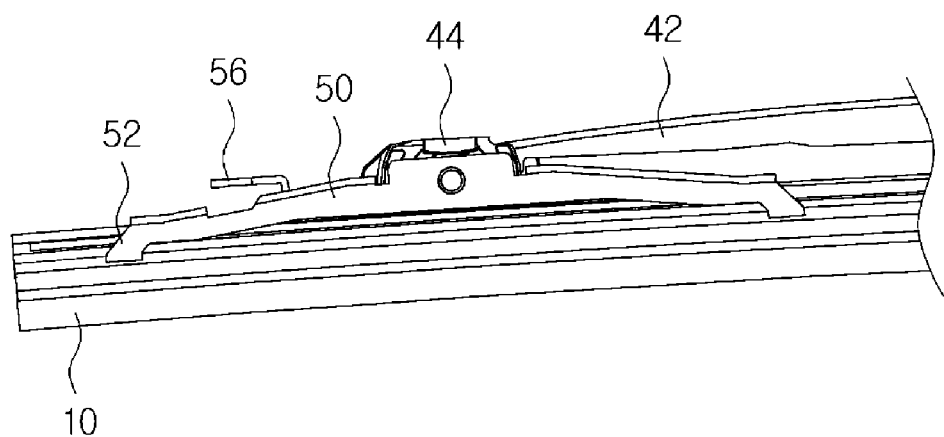
FIG. 10 is an enlarged view illustrating a yoke in a lever structure of a wiper device according to an embodiment of the present invention.

Referring to FIG. 10, since the yoke 50 is not limited to the width of the extension lever 40, so that the width of the yoke 50 can be widened, the contact member 10 may be inserted inside the yoke 50. For example, the yoke 50 may have a " ⊏ " shaped cross section opened toward the contact member 10 and a part of the contact member 10 may be inserted into an " ⊏ " shaped internal space. Thus, the height of the wiper device may be lowered by the thickness in which the contact member 10 is inserted into the yoke 50.

The extension lever 40 may include a lever body 42 made of a metal and a connection member 44 made of a synthetic resin material which is coupled to the lever body 42 and hinge-connected to the yoke 50. When the extension lever 40 is hinge-connected to the yoke 50 made of a metal, the connection member 44 made of a synthetic resin may be interposed between the lever body 42 made of a metal.

Figure 8:
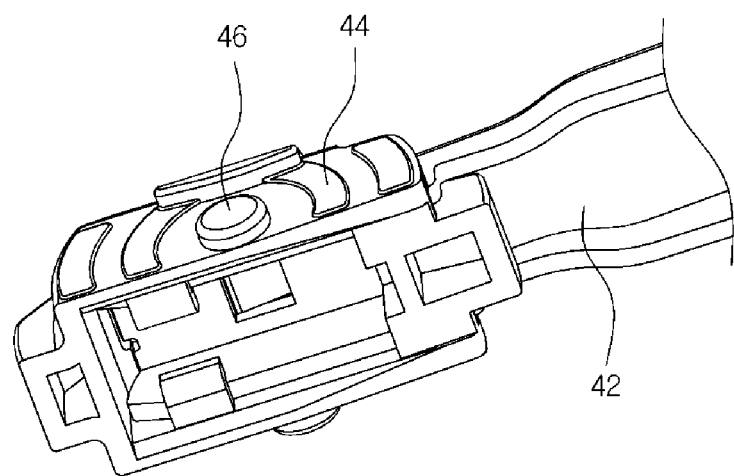
FIG. 8 and FIG. 9 are enlarged views illustrating a connection member in a lever structure of a wiper device according to an embodiment of the present invention.
Figure 9:
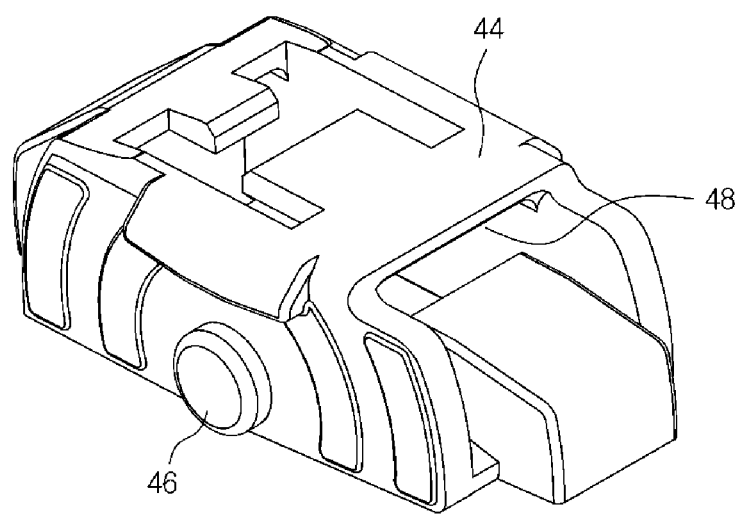

FIG. 8 and FIG. 9 are enlarged views illustrating a connection member in a lever structure of a wiper device according to an embodiment of the present invention.

Referring to FIG. 6 and FIG. 8, hinge grooves 54a may be formed in a row in the pair of hinge walls 54 in the yoke 50. The hinge groove 54a may be a pass-through groove or a one side blocked groove. Here, the connection member 44 may be disposed between the pair of hinge walls 54. A pair of hinge protrusions 46 may be formed in the connection member 44 and inserted into the hinge groove 54a of the hinge wall 54 so that the connection member 44 may be hinge-connected to the yoke 50.

Referring to FIG. 8 and FIG. 9, a connection groove 48 may be formed in the connection member 44 and one end portion 42a of the lever body 42 may be inserted to be fitted into the connection groove 48.

The characteristic structure of the present invention is illustrated through the extension lever 40 and the yoke 50, but it is not limited thereto. For example, when a second extension lever other than the yoke 50 is extended to the extension lever 40, a width of the extension lever 40 may be smaller than or equal to that of the second extension lever. In addition, when the yoke 50 is connected to a second extension lever, a width of the second extension lever may be smaller than or equal to that of the yoke 50.

In addition, the structure in which the extension lever 40 and the yoke 50 are hinge-connected through the connection member 44 is illustrated in the present invention, but it is not limited thereto. Each of the extension lever 40 and the yoke 50 may be formed in a single body and may be directly hinge-connected without any auxiliary member such as the connection member 44. For example, the extension lever may be integrally formed. Here, one end of the extension lever may be inserted between the pair of hinge walls formed in the yoke and, thus, the extension lever and the yoke may be directly hinge-connected by a rivet or the like.

The adapter 60 may receive force from the wiper arm and transmit it to the lever structure 20. The adapter 60 may be coupled to the lever structure 20 and the wiper arm may be connected thereto. The adapter 60 may be connected to and mounted in a connection hole, a connection shaft, or the like formed in the lever structure 20.

Referring to FIG. 1 to FIG. 3, a part of the adapter 60 may be inserted into the connection hole 32 formed in the lever structure 20, so that the adapter 60 may be mounted on the lever structure 20.

The wiper device according to an embodiment of the present invention may further include a cover member 70 covering the lever structure 20. The cover member 70 may have a spoiler function to provide an additional pressing pressure to the lever structure 20 by the force of air.

Referring to FIG. 1 to FIG. 3, the wiper device of the present embodiment may include a pair of cover members 70 covering from the primary lever 30 to the yoke 50.

Here, a connector 56 (see FIG. 5) for fixing the cover member 70 may be formed on at least one of the levers of the lever structure 20. For example, the connector 56 may be formed on at least one of the primary lever 30, the extension lever 40, and the yoke 50.

The connector 56 may have an "┐" shape toward the outside based on a lengthwise direction of the lever structure 20. Here, Here, a "┐" shape may be inserted into and coupled to a part of the cover member 70.

Referring to FIG. 5, the connector 56 having a "┐" shape protruded toward the outside from an upper surface of the yoke 50 may be formed. A lower part of the "┐" shape may be coupled to an upper surface of the yoke 50 and the upper end of the free end may face outwardly.

Although a certain embodiment of the present invention has been described above, it shall be appreciated that there can be a variety of permutations and modifications of the present invention by those who are ordinarily skilled in the art to which the present invention pertains without departing from the technical ideas and scope of the present invention, which shall be defined by the appended claims.

It shall be also appreciated that many embodiments other than the embodiment described above are present in the claims of the present invention.

DESCRIPTION OF REFERENCE NUMERALS

10: Contact member
20: Lever structure
30: Primary lever
40: Extension lever
42: Lever body
44: Connection member
46: Hinge protrusion
48: Hinge groove
50: York
54: Hinge wall
60: Adapter
70: Cover member

What is claimed is:

1. A wiper device configured to be coupled to a wiper arm to remove a foreign substance, comprising:
a contact member configured to wipe off the foreign substance;
a lever structure configured to press the contact member to be in contact with a windshield and having a plurality of levers connected in a multi-level structure from the wiper arm to the contact member; and
an adapter configured to be coupled to the lever structure and configured to be connected to the wiper arm,
wherein at least one lever of the plurality of levers is formed to have less width or equal width to that of a lower lever based on the multi-level structure,
wherein the lever structure comprises a primary lever, an extension lever connected to the primary lever in a hinge structure, and a yoke connected to the extension lever in a hinge structure and coupled to the contact member,
wherein a width of the extension lever is less than or equal to a width of the yoke,
wherein the yoke has a penetration part formed at a middle portion thereof, the penetration part being vertically perforated and having either lateral surface thereof blocked,
wherein the yoke comprises a pair of hinge walls formed at the either lateral surface of the penetration part to face each other,
wherein the extension lever comprises a lever body and a connection member coupled to the lever body and hinge-connected to the yoke,
wherein the connection member is disposed in the penetration part to be hinge-coupled to the pair of hinge walls, and
wherein the connection member is provided with a connection groove such that one end of the lever body is fitted into and coupled to the connection groove.

2. The wiper device of claim 1, wherein hinge grooves are formed in a row in the pair of hinge walls of the yoke, and the connection member is provided with a pair of hinge protrusions to be inserted into the hinge grooves.

3. The wiper device of claim 1, further comprising a cover member covering the lever structure,
wherein at least one of the levers of the lever structure is provided with a connector fixing the cover member,
wherein the connector has a "┐" shape toward an outside, based on a lengthwise direction of the lever structure, and
wherein the "┐" shape is inserted into and coupled to a part of the cover member.

* * * * *